United States Patent [19]

Laughner

[11] Patent Number: 5,008,330
[45] Date of Patent: Apr. 16, 1991

[54] MOLDING COMPOSITIONS WITH ACRYLONITRILE-EPDM-STYRENE COPOLYMERS

[75] Inventor: Michael K. Laughner, Lake Jackson, Tex.

[73] Assignee: The Dow Chemical Company, Midland, Mich.

[21] Appl. No.: 411,279

[22] Filed: Sep. 22, 1989

Related U.S. Application Data

[63] Continuation-in-part of Ser. No. 320,680, Mar. 8, 1989, abandoned.

[51] Int. Cl.$^5$ .............................................. C08L 69/00
[52] U.S. Cl. .................................... 525/67; 525/71
[58] Field of Search ................... 525/67, 146, 148, 71; 264/523, 540, 544

[56] References Cited

U.S. PATENT DOCUMENTS

| | | | |
|---|---|---|---|
| 4,656,225 | 4/1987 | Boutni | 525/67 |
| 4,792,585 | 12/1988 | Yamamoto | 525/67 |
| 4,855,357 | 8/1989 | Whalen et al. | 525/67 |

*Primary Examiner*—Melvyn I. Marquis
*Assistant Examiner*—David Buttner

[57] ABSTRACT

Carbonate polymers (PC) such as randomly branched carbonate polymers, linear carbonate polymers and blends thereof are blended with acrylonitrile-ethylene-propylene-diene rubber (EPDM)-styrene copolymers and MBS as impact modifiers. The MBS impact modifiers are located at the PC and the acrylonitrile-ethylene-propylene-diene rubber (EPDM)-styrene copolymer interphases or in the PC phase so that higher melt elasticity and better blow molding is achieved.

12 Claims, 1 Drawing Sheet

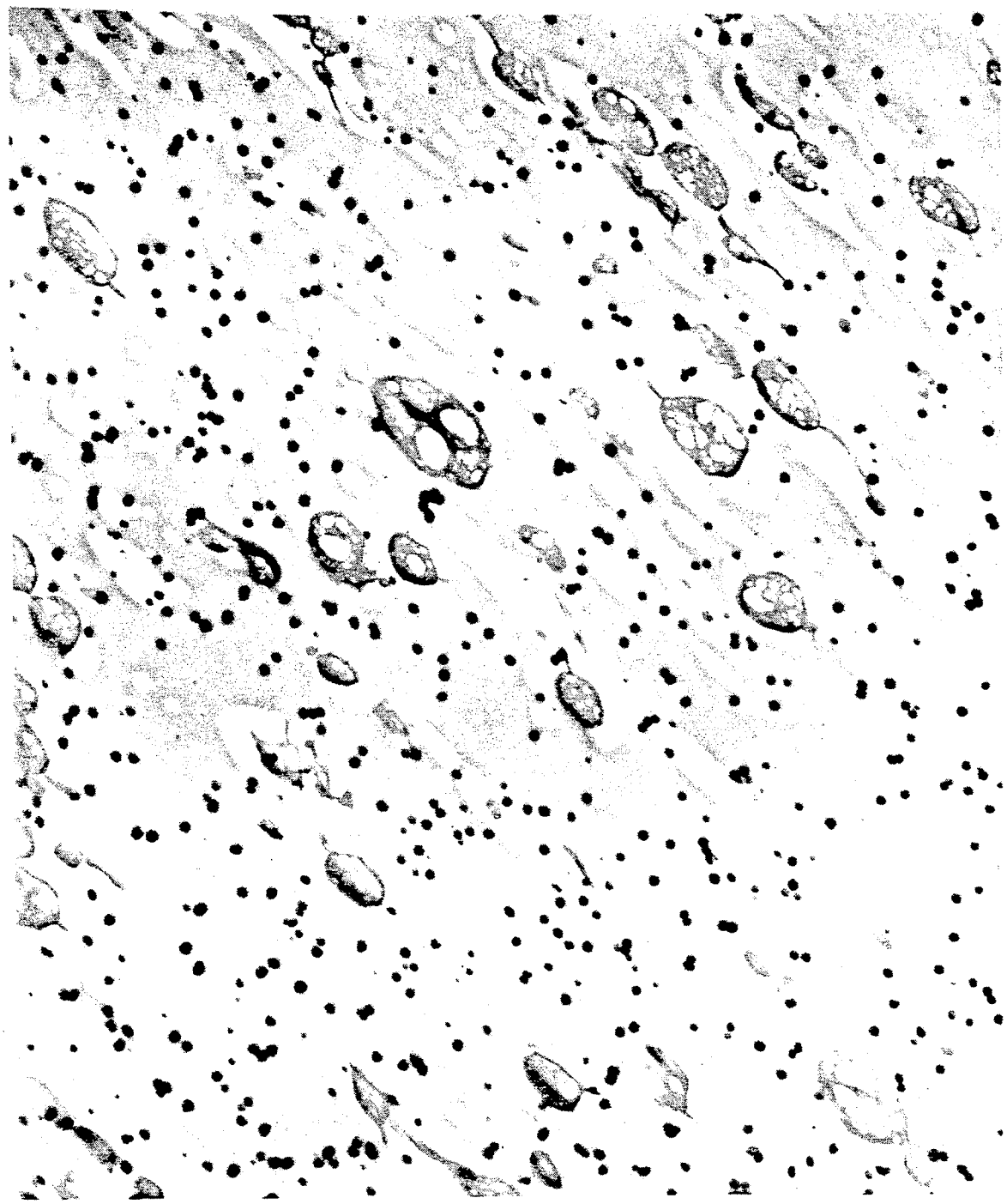

MOLDING COMPOSITIONS WITH ACRYLONITRILE-EPDM-STYRENE COPOLYMERS

BACKGROUND OF THE INVENTION

This application is a Continuation-in-Part of the copending application Serial No. 07/320680, filed Mar. 8, 1989 now abandoned.

This invention relates to thermoplastic resin compositions and more particularly relates to improved blends of carbonate polymers and acrylonitrile-ethylene-propylene-diene rubber-styrene copolymers (AES) and a method of using the compositions.

More specifically, this invention relates to molding compositions comprising a blend of (1) carbonate polymers with (2) graft copolymers of ethylene-propylene-diene terpolymer (EPDM) or a EPDM-vinyl aromatic hydrocarbon copolymer with a mixture of acrylonitrile and a vinyl aromatic hydrocarbon and (3) core/shell graft copolymers of alkyl acrylate or butadiene or butadiene-vinyl aromatic hydrocarbon or butadiene-vinyl aromatic hydrocarbon-alkyl acrylate with optionally a second phase of vinyl aromatic hydrocarbon and a outer shell of alkyl (meth)acrylate.

Although polycarbonate/AES compositions have been found to be thermoplastically moldable under a broad range of injection molding conditions, only select polycarbonate blends are suitable for blow molding. This is due to the unique requirement of thermoplastic resin for blow molding operations.

In the conventional blow molding operation, as taught in U.S. Pat No. 4,652,602 and U.S. Pat. No. 4,474,999, a tube or parison of the heat softened thermoplastic blend may be extruded vertically downward into a mold. The extrudate is then pressed unto the mold surfaces with a pressurized gas flow (usually air or inert gas), shaping the heat softened resin. As appreciated by those skilled in the art, the successful molding of a given thermoplastic resin is dependent upon a number of factors, including the characteristics and physical properties of the heat softened resin. The length and diameter of the tube and the quantity of material forming the tube are limiting factors in determining the size and wall thickness of the object that can be molded by this process. The fluidity of the melt obtained from polycarbonate/AES blends, or the lack of melt strength as well as the paucity of extrudate swelling, serve to limit blow molding applications to relatively small, thin walled parts. These factors alone are of considerable importance in the successful blow molding of any resin, particularly in regard to the molding of large articles.

It is known from Japanese patent 58/59258 that resin compositions with good weld strength can be obtained from blends of linear polycarbonate resins, acrylonitrile-butadiene-styrene resins (ABS), and rubbery graft copolymer resins (MBS). However, this reference does not suggest the advantage of using acrylonitrile-ethylene-propylene-diene rubber-styrene copolymers, to control rubber placement. This patent is attempting to modify the ABS phase to improve the weldline by utilizing MBS resins containing 30–50% rubber and styrene in the outer shell. It is believed that having styrene in the outer shell helps to drive the MBS resins into the ABS phase where the added rubber helps to improve the poor weldline properties of the ABS.

It is further known from U.S. Pat. No. 4,677,162 that a moldable blend of both linear or branched polycarbonate resins (PC), acrylonitrile-butadiene-styrene resins (ABS), and rubbery graft copolymers (MBS) is useful to form articles with good impact and low gloss. However, this reference utilizes only ABS resins and does not recognize the advantage of using AES a more environmentally stable resin.

SUMMARY OF THE INVENTION

The present invention is directed to a thermoplastic blend composition useful for blow molding comprising
(A) about 20 to about 95% by weight and preferably about 35 to about 85% by weight of a carbonate polymer selected from the group consisting of
(i) randomly branched carbonate polymers,
(ii) linear carbonate polymers, and
(iii) blends of randomly branched carbonate polymers with linear carbonate polymers,
B) about 5 to about 75% by weight and preferably about 10 to about 60% by weight of a acrylonitrile/ethylene-propylene-diene rubber/styrene copolymer, and
C) about 1 to about 20% by weight and preferably about 2 to about 15% by weight of a core-shell graft copolymer of a butadiene polymer or a graft copolymer of butadiene or alkyl acrylate polymer having an outer shell of a polymerized alkyl (meth)acrylate.

A further aspect of the present invention is a process of preparing blow molded articles using the above composition.

The articles produced and/or molded by using the compositions of the invention are useful as automotive components, bottles, tool housings and the like.

BRIEF DESCRIPTION OF THE DRAWING

The figure is a transmission electron micrograph (TEM) photograph of Example 1 showing that the PC/AES/MBS blend has the MBS rubber (small black spheres) located at the dark gray polycarbonate interphase or polycarbonate phase. The photograph shows the location of the small particles of rubbery impact modifier in both the polycarbonate and the AES resin interphases and this location of the rubber particles in both phases or interphases results in higher melt elasticity, elastic modulus and higher zero shear viscosity. These are properties which are desirable and/or useful in blow molding of large parts since high R* values (a measure of melt elasticity) are needed for the blow molding of parisons weighing 2 pounds or more. The ability to control the placement of rubber, such that rubber now resides in each phase or interphase of a multi-phase polymer blend, is desirable to increase the melt elasticity of compositions used for large part blow molding applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(arhydroxyphenyl)-alkylidenes (often called bisphenol-A type diols) including their aromatically and aliphatically substituted derivatives such as disclosed in U.S. Pat. Nos. 2,999,835; 3,028,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731; 4,330,662; 4,360,656; 4,374,973; 4,225,556; 4,388,455; 4,355,150; and 4,105,633. Of the aforementioned carbonate polymers, the polycarbonates of bisphenol-A are preferred. Methods for preparing carbonate polymers for use in the practice of this invention are well known, for example, several suitable methods are disclosed in the aforementioned patents which are hereby incorporated by reference in their entirety.

The branched chain polycarbonates used in this invention are prepared by reacting a dihydric phenol with phosgene in the presence of a trihydric and/or tetrahydric phenol. U.S. Pat. No. 3,544,514 discloses the process details and this patent is incorporated herein by reference.

Blow moldable resins and their desired properties are taught in U.S. Pat. Nos. 4,652,602 and 4,474,999 which are incorporated herein by reference. U.S. Pat. No. 4,652,602 is particularly pertinent since it gives a definition of R* which is a measure of blow moldability.

The grafted copolymers of the present invention are generally characterized as having a core-shell structure, typically prepared by means of an emulsion polymerization process, or a core-matrix structure, typically prepared by a mass polymerization process. The grafted copolymers of the present invention generally comprise about 5% to 95% by weight of an elastomeric rubber core, and about 95% to about 5% by weight of either a rigid grafted-on thermoplastic polymer shell in the case of a core-shell copolymer, or a grafted-on thermoplastic polymer matrix in the case of a core-matrix copolymer. Examples of suitable grafted copolymers of the core-shell type are a methylmethacrylate/butadiene/styrene grafted copolymer (MBS rubber), and a butyl acrylate core-rigid methyl methacrylate thermoplastic shell copolymer. An example of a suitable grafted copolymer of the core-matrix type is an acrylonitrile/EPDM/styrene grafted copolymer (AES copolymer). AES resins may be characterized as an ethylene-propylene-non-conjugated diene interpolymer grafted with the homopolymer or copolymer of monoethylenically unsaturated monomers as described in U.S. Pat. No. 4,202,948.

The preferred grafted copolymers are generally obtained by polymerizing certain monomers in the presence of an EPDM or acrylate or diene rubber core. By the term EPDM is meant ethylene propylene diene terpolymers. By the term diene rubber is meant homopolymers of conjugated dienes have 4 to 8 carbon atoms such as butadiene, isoprene, piperylene, chloroprene, and copolymers of such dienes with other monomers, such as for example, acrylonitrile, methacrylonitrile, butyl acrylate, methyl methacrylate, styrene, α-methylstyrene, and the like. By the term acrylate is meant homopolymers of alkyl acrylate or alkyl methacrylates where alkyl is a $C_1$ to $C_{10}$ etc. The rubber core may be at least partially crosslinked, or may contain thermoplastic polymer inclusions such as for example when mass polymerization is used to prepare the grafted copolymer. The aforementioned certain monomers are grafted onto the rubber core to form either the shell or matrix. At least one of these monomers is selected from the group including styrene and its derivatives, such as for example α-methylstyrene, acrylic acids, methacrylic acids, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, maleic anhydride and the like. Preferred grafted copolymers are MBS rubbers, butyl acrylate core-rigid shell copolymers, AES copolymers, and butadiene/styrene/acrylonitrile core-shell type copolymers.

An MBS rubber contains a substrate latex, or core, which is made by polymerizing a conjugated diene, or by copolymerizing a conjugated diene with a mono-olefin or polar vinyl compound, such as styrene, acrylonitrile or methyl methacrylate. The substrate latex is typically made up of about 45-75% conjugated diene and about 25-55% of the mono-olefin or polar vinyl compound. A mixture of monomers is graft polymerized to the substrate latex. A variety of monomers may be used for this grafting purpose, of which the following are exemplary: vinyl compounds such as vinyl toluene, alphamethyl styrene, halogenated styrene, naphthalene, acrylonitrile, methacrylonitrile or alpha-halogenated acrylonitrile, or a $C_1$-$C_8$ alkyl acrylate such as methacrylate, ethylacrylate or hexyl acrylate, a $C_1C_8$ alkyl methacrylate such as methyl methacrylate, ethyl methacrylate or hexyl methacrylate, an acrylic or methacrylic acid, or a mixture of two or more of the foregoing. The extent of grafting is sensitive to the substrate latex particle size, and particle size may be influenced by controlled coagulation techniques among other methods. When the graft level is allowed to reach an excessively high level, the rubbery effect of the relative substrate latex content is reduced.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for an MBS rubber is about 60-80 parts by weight substrate latex, about 10-20 parts by weight first monomer and about 10-20 parts by weight second monomer. A preferred formulation of an MBS rubber is one having a core built up from about 71 parts of butadiene, about 3 parts of styrene, about 4 parts of methyl methacrylate and about 1 part of divinyl benzene; a second phase of about 11 parts of styrene: and a shell phase of about 11 parts of methyl methacrylate and about 0.1 part of 1,3-butylene glycol dimethacrylate, where the parts are by weight of the total composition. A product having substantially such content is available commercially from Rohm and Haas Company as Paraloid TM EXL 3607 core-shell polymer. The MBS rubber and methods for making same, as described above, are discussed in greater detail in U.S. Pat. No. 3,243,481, U.S. Pat. No. 3,287,443, U.S. Pat. No. 3,509,237, U.S. Pat. No. 3,657,391, U.S. Pat. No. 3,660,535, U.S. Pat. No. 4,180,494, U.S. Pat. No. 4,221,833, U.S. Pat. No. 4,239,863 and U.S. Pat. No. 4,617,345 each of which is hereby incorporated by reference herein.

Acrylonitrile-EPDM-styrene copolymer resins are commercially available and well known from U.S. Pat.

No. 3,642,950 which is incorporated herein by reference.

The following examples and controls are presented to further illustrate the invention.

Control

One thousand three hundred parts by weight of a linear polycarbonate (Calibre TM 300-10, Dow Chemical Company) was mixed with 700 parts by weight acrylonitrile-EPDM-styrene copolymer, 2 parts by weight epoxy soybean oil (Plas Chek TM 775 from the Ferro Company), and 4 parts by weight Irganox TM 1076 antioxidant (from Ciba Geigy).

The mixture was uniformly blended together in a laboratory tumbler. The blend is introduced into a 30 mm Werner-Pfleiderer melt extruder, with heating set points of 270° C. The extrudate is pelletized and dried. The pellets are fed to a 70 ton Arburg injection molding machine to mold test bars of 12.6 cm×2.25 cm with a thickness of 3.175 mm. The moldings are subjected to tests to determine their blow moldability (R* value), and 10 mil notched Izod.

The composition of each blend is given in Table 1 below. Each example of the composition was made by following the procedure for the control. The test results are given in Table 2 below.

These compositions may be useful for injection molding, blow molding or thermoforming applications and are not intended to be limited to only blow molding applications.

These compositions may also contain other ingredients such as UV and antioxidant stabilizers, fillers such as talc, reinforcement agents and such as mica or glass fibers, ignition resistant additives, pigments, antistat agents, mold release additives, etc. Other rubber modified SAN copolymers such as ASA or ABS may also be added to this invention and are thus included within the scope of this invention.

TABLE 1

| | PC/AES | | | | |
|---|---|---|---|---|---|
| | Lin. PC (gms/ wt %) | Bran. PC (gms/ wt %) | AES (gms/ wt %) | Para 3607 (gms/ wt %) | Para 3330 (gms/ wt %) |
| Control | 1300/ 65 | 0 | 700/ 35 | 0 | 0 |
| Example 1 | 1240/ 62 | 0 | 640/ 32 | 120/ 6 | 0 |
| Example 2 | 620/ 31 | 620/ 31 | 640/ 32 | 120/ 6 | 0 |
| Example 3 | 620/ 31 | 620/ 31 | 640/ 32 | 0 | 120/ 6 |

Notes:
Lin. PC = linear polycarbonate 10 MFR.
Bran. PC = branched polycarbonate 3 MFR.
Para 3607 = Paraloid TM 3607 methylmethacrylate-styrene-butadiene core/shell graft copolymer from Rohm and Haas.
Para 3330 = Paraloid TM 3330 butyl acrylate rubber-methylmethacrylate graft copolymer from Rohm and Haas.
AES = acrylonitrile-EPDM-styrene copolymer from the Dow Chemical Company (Rovel TM F-301)

All compositions contained 2 grams of epoxidized soybean oil and 4 grams of Irganox TM 1076 a high molecular weight, sterically hindered phenolic antioxidant from Ciba Geigy.

TABLE 2

| | R* | ⊥ Izod | | ‖ Izod | |
|---|---|---|---|---|---|
| | | 23° C. | −29° C. | 23° C. | −29° C. |
| Control | 3.7 | 416 | 85 | 562 | 133 |
| Example 1 | 4.6 | 406 | 134 | 571 | 235 |
| Example 2 | 5.6 | 417 | 139 | 561 | 240 |
| Example 3 | 4.7 | 422 | 112 | 577 | 171 |

Notes:
(1) Izod ⊥ = Izod values (according to ASTM D-256 in joules/meter) perpendicular to the direction of polymer flow taken at the given temperatures.
Izod ‖ = Izod values (according to ASTM D-256 in joules/meter) parallel to the direction of polymer flow taken at the given temperatures.
(2) R* = viscosity ratio.

Control 1 is an example of a PC/AES composition. Example 1 illustrates that higher R* vales and better low temperature izod impact values are obtained over control 1 when MBS is added and preferentially located in the polycarbonate phase and/or interphase. Example 2 shows an even larger increase R* values can be obtained by utilizing a branched polycarbonate in the blend while Example 3 shows other core/shells rubbers like butyl acrylate may also be used to obtain high R* values and high impact properties.

Thus, it is desirable to locate rubber preferentially in each phase or interphase of a multiphase polymer composition. Such compositions then exhibit increased melt elasticity at low shear rates which is desirable for improved blow molding or thermoforming applications.

I claim:
1. A moldable composition comprising:
    (A) about 20 to about 95% by weight of a carbonate polymer selected from the group consisting of
        (i) randomly branched carbonate polymers,
        (ii) linear carbonate polymers, and
        (iii) blends of randomly branched carbonate polymers with linear carbonate polymers,
    (B) about 5 to about 75% by weight of a copolymer consisting of acrylonitrile/ethylene-propylenediene rubber/styrene and optionally one or more monomers selected from the group consisting of α-methylstyrene, acrylic acid, methacrylic acid, methacrylonitrile, methyl acrylate, ethyl acrylate, n-butyl acrylate, isobutyl acrylate, methyl methacrylate, n-butyl methacrylate, isobutyl methacrylate, glycidyl methacrylate and maleic anhydride.
    (C) about 1 to about 20% by weight of a core-shell graft copolymer having a butadiene polymer core and having an outer shell of a polymerized alkyl (meth)acrylate.
2. A moldable composition according to claim 1 comprising
    (A) about 20 to 95% by weight of a randomly branched carbonate polymer.
3. A moldable composition according to claim 1 comprising
    (A) about 20 to 95% by weight of a linear carbonate polymer.
4. A moldable composition according to claim 1 comprising
    (A) about 20 to 95% by weight of a blend of randomly branched carbonate polymers with linear carbonate polymers.
5. A moldable composition according to claim 1 comprising
    (A) about 35 to about 85% by weight of a carbonate polymer selected from the group consisting of
        (i) randomly branched carbonate polymers,
        (ii) linear carbonate polymers, and

(iii) blends of randomly branched carbonate polymers with linear carbonate polymers, (B) about 10 to about 60% by weight of a copolymer consisting essentially of acrylonitrile/ethyline-propylene-diene rubber/styrene, and (C) about 2 to about 15% by weight of a core-shell graft copolymer having a butadiene polymer core and having an outer shell of a polymerized alkyl (meth)acrylate.

6. A moldable composition according to claim 5 comprising (A) about 35 to about 85% by weight of a randomly branched carbonate polymer.

7. A moldable composition according to claim 5 comprising (A) about 35 to about 85% by weight of a linear carbonate polymer.

8. A moldable composition according to claim 5 comprising (A) about 35 to about 85% by weight of a blend of randomly branched carbonate polymers with linear carbonate polymers.

9. A process for the preparation of a molded article comprising the steps of:

(A) providing a composition having high melt viscosity and/or melt strength comprising (I) about 20 to about 95% by weight of a carbonate polymer selected from the group consisting of (i) randomly branched carbonate polymers, (ii) linear carbonate polymers, and (iii) blends of randomly branched carbonate polymers with linear carbonate polymers, (II) about 5 to about 75% by weight of a copolymer consisting of acrylonitrile/ethylene-propylene-diene rubber/styrene and optionally one or monomers selected from the group consisting of α-methylstryrene, acrylic acid, methacrylic acid, methacrylonitrile, methyl acrylate, ethyl acrylate, n-butyl acrylate, isobutyl acrylate, methyl methacrylate, n-butyl methacrylate, isobutyl methacrylate, glycidyl methacrylate and maleic anhydride.

(III) about 1 to about 20% by weight of a core-shell graft copolymer having a butadiene polymer core and having an outer shell of a polymerized alkyl (meth)acrylate and (B) molding said composition to form an article.

10. The process as set forth in claim 9 wherein said carbonate polymer is randomly branched carbonate polymer.

11. The process as set forth in claim 9 wherein said carbonate polymer is a linear carbonate polymer.

12. The process as set forth in claim 9 wherein said carbonate polymer is a blend of a randomly branched carbonate polymer with a linear carbonate polymer.

* * * * *